(No Model.) 3 Sheets—Sheet 1.
C. H. NORTON.
GRINDING MACHINE.
No. 429,697. Patented June 10, 1890.
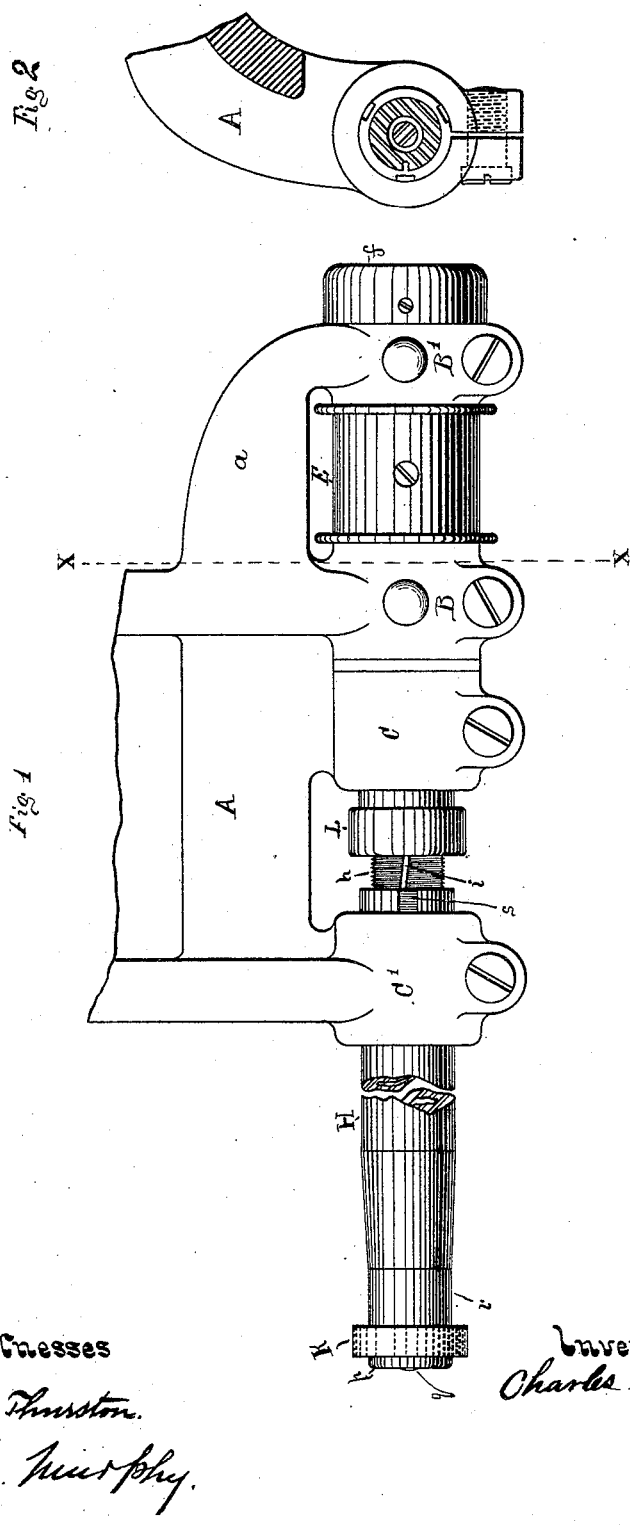
Witnesses
H. H. Thurston.
S. J. Murphy.
Inventor
Charles H. Norton (No Model.) 3 Sheets—Sheet 2.
C. H. NORTON.
GRINDING MACHINE.
No. 429,697. Patented June 10, 1890.
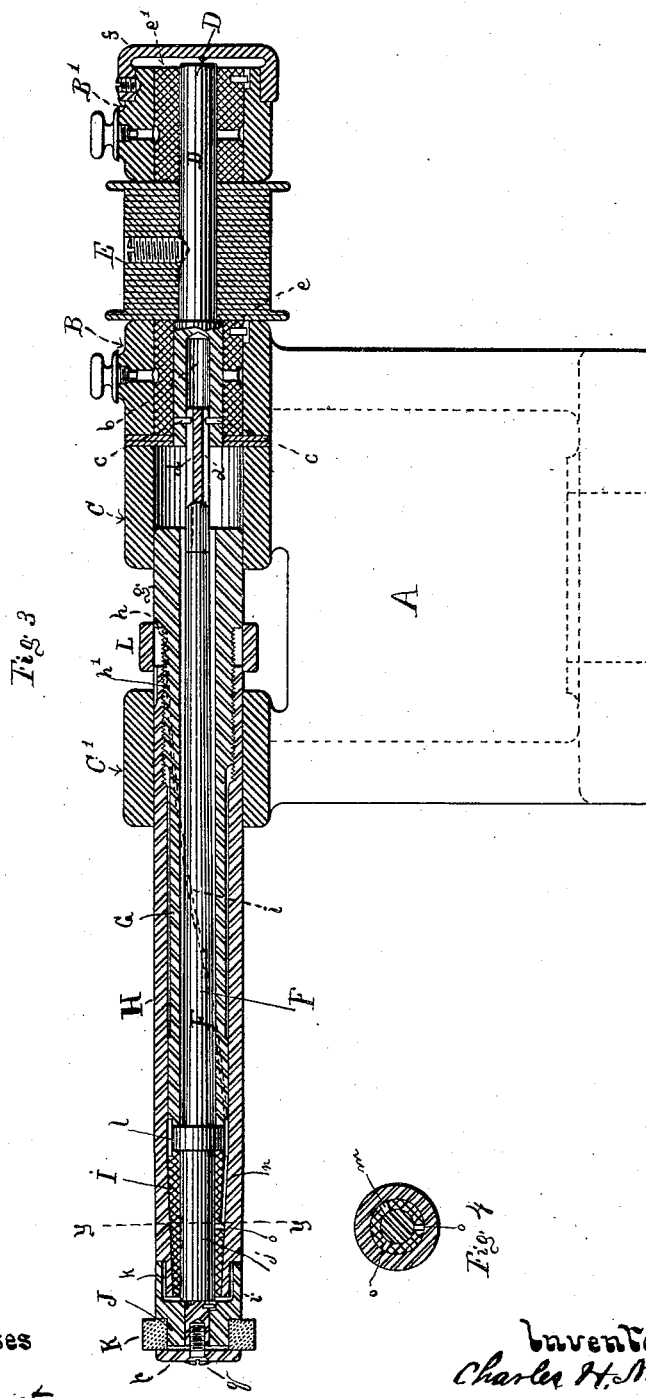
Witnesses
H. H. Thurston.
S. J. Murphy.
Inventor
Charles H. Norton

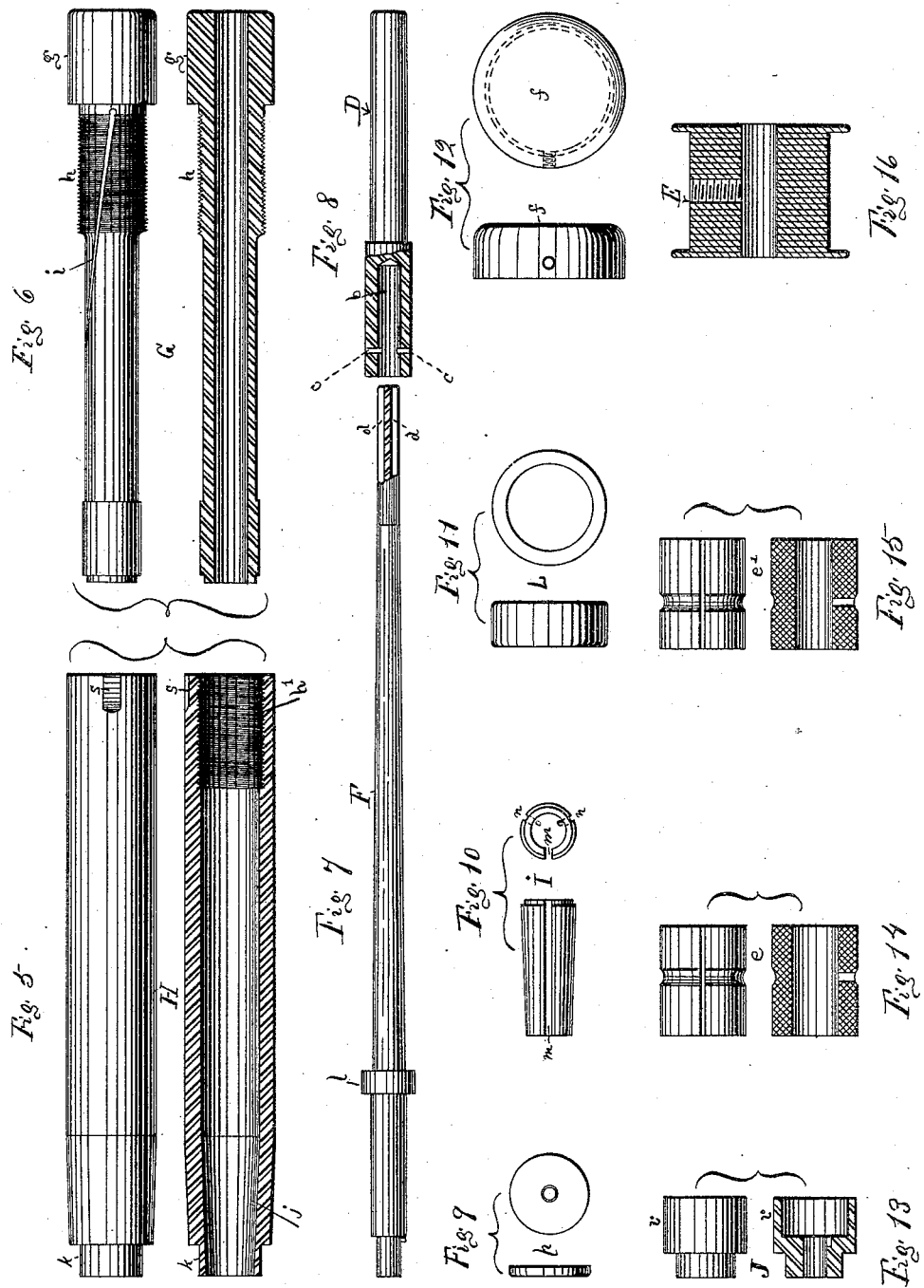
(No Model.) 3 Sheets—Sheet 3.
C. H. NORTON.
GRINDING MACHINE.
No. 429,697. Patented June 10, 1890.

UNITED STATES PATENT OFFICE.

CHARLES H. NORTON, OF PROVIDENCE, RHODE ISLAND, ASSIGNOR TO THE BROWN & SHARPE MANUFACTURING COMPANY, OF SAME PLACE.

GRINDING-MACHINE.

SPECIFICATION forming part of Letters Patent No. 429,697, dated June 10, 1890.

Application filed July 29, 1889. Serial No. 319,037. (No model.)

*To all whom it may concern:*

Be it known that I, CHARLES H. NORTON, of the city and county of Providence, in the State of Rhode Island, have invented certain new and useful Improvements in Grinding-Machines; and I do hereby declare the following specification, taken in connection with the accompanying drawings, forming a part of the same, to be a full, clear, and exact description thereof.

Grinding-machines, as is well known, are commonly employed to grind interior as well as exterior surfaces, and for that purpose are provided with spindles adapted to enter the aperture whose interior surface is to be ground.

The improvements hereinafter described relate especially to spindles for grinding interior surfaces. Heretofore it has been customary to employ simply an ordinary solid spindle or shaft supported in bearings, with the pulley for driving the same mounted on one end and the emery or other grinding-wheel on the other end. The use of such a spindle is attended with serious difficulties. In order to grind the interior surfaces of holes of any considerable depth with such solid spindles, the end of the spindle carrying the grinding-wheel must necessarily project a corresponding distance beyond the bearing of the spindle. It is evident that any motion or play of the spindle radially in its bearing will be multiplied at the end of the spindle where the grinding-wheel is mounted by the distance of such end of the spindle from its bearing. Consequently even a slight motion or play of the spindle in its bearing will produce a very considerable motion at the end of the spindle, resulting in the production of imperfect work. Moreover, the grinding-spindle had to be made of a considerable diameter in order to give it sufficient rigidity, owing to the fact that it had no bearing or support near the grinding-wheel. This large diameter renders it impossible to attain the necessary high speed required to render the work of the grinding-wheel thoroughly efficient. Furthermore, when pressure was brought upon the end of the spindle by the action of the grinding-wheel upon the work being ground such pressure would tend to spring or force the spindle against its bearing with increased power by reason of the leverage due to the distance between the grinding-wheel and the bearing for the spindle. This necessarily produced a great amount of friction between the spindle and its bearing, and thus on this account also tended to prevent the high speed required.

Attempts have heretofore been made to overcome these difficulties by mounting a grinding-spindle of comparatively small diameter in a tube of considerably larger diameter, and so that said tube would furnish a bearing for the grinding-spindle in close proximity to the grinding-wheel. Such attempts have not, however, so far as I know, been successful, and a machine of the character referred to was found when put to use to develop other and more serious difficulties to such an extent that it was found necessary to return to the ordinary solid spindle, and it is still customary to employ the old and well-known solid spindles in grinding-machines for grinding interior surfaces, notwithstanding the difficulties attending the use of the same above recited.

To overcome, among others, the difficulties referred to and to provide an attachment for grinding-machines for grinding interior surfaces which shall be thoroughly useful and efficient is the object of the present improvements; and to that end my invention consists, primarily, in employing a grinding-spindle of comparatively small diameter, which can consequently be revolved at the necessary high speed, and mounting this small spindle in a pair of telescopic tubes of sufficiently large diameter to give the required rigidity, the said tubes being adjustable longitudinally relatively to each other, and one of said tubes furnishing a support or bearing for the grinding-spindle in close proximity to the grinding-wheel. In addition to this broad feature, certain minor combinations will also be described, and pointed out in the claims.

Referring to the drawings, Figure 1 is a top view of a grinding-spindle embodying my improvements, a portion of the spindle being broken out. Fig. 2 is a transverse section on the line *x x* of Fig. 1. Fig. 3 is a central longitudinal section of Fig. 1. Fig. 4 is a transverse section on the line *y y* of Fig. 3. Figs. 5 to 16, inclusive, represent detached parts of the apparatus.

A is a stand or base adapted to be attached to a grinding-machine and provided with an arm or extension *a*, as shown in Fig. 1. This stand is provided with suitable bearings B B′, for supporting the pulley spindle or shaft, and with clamping-supports C C′, for holding the tubes which support the grinding-spindle, as hereinafter described.

The pulley-spindle D, which is made comparatively short, is mounted in the bearings B B′ and carries the driving-pulley E, which is firmly secured to the spindle between the bearings B B′, as shown in the drawings. This pulley-spindle is provided at its inner end with a recess or chamber *b* to receive the tail of the grinding-spindle F, into which chamber project two or more pins *c c*, adapted to engage with corresponding grooves or slots *d d*, formed in the tail of the grinding-spindle F, to rotatively connect the two spindles together. The bearings B B′ (shown in the drawings) are ordinary adjustable bearings provided with suitable bushings *e e′*, and need not be particularly described in this connection. Over the outer end of the pulley-spindle a dust-cap *f* may be secured to exclude dust, &c., from the bearings.

The grinding-spindle F is inclosed and supported in two telescopic tubes G and H, constructed and arranged as clearly shown in the drawings. One end of the inner tube G, which is enlarged in diameter, as shown at *g*, is firmly clamped in the support C in a position so as to be concentric with the axles of the pulley-spindle. Adjoining the enlarged portion of the tube G is a male screw-thread *h*, as shown in the drawings. The exterior surface of this tube G is also provided with a spiral slot *i* for conducting oil to the bearing of the grinding-spindle. The outer tube H is clamped in the support C′ concentric with the tube G, and is provided at one end with a female screw-thread *h′* to engage with the male thread upon the tube G, and at the other end of the tube H the bore of the tube is tapered, as at *j*, for the purposes hereinafter described. At its extreme outer end the exterior diameter of the tube H is reduced, thus forming a projection *k*.

The grinding-spindle is provided near its outer end with a collar or enlargement *l*, against one side of which the end of the inner tube G bears. Surrounding the grinding-spindle on the other side of the collar *l* is a tapering bushing or box I, which occupies, when the parts are assembled together, the tapered portion of the tube H, as clearly shown in Fig. 3, and which thus constitutes a support or bearing for the grinding-spindle at its outer end and in close proximity to the grinding-wheel. This tapering bushing I is split entirely through on one side, as at *m*, Fig. 10, to give to it the capacity for contraction, and is also provided with two partial cuts or grooves *n n*, which add to its elasticity, and which also by communicating with holes *o o*, bored through the walls of the bushing, serve as oil-ducts to conduct oil to the bearing of the grinding-spindle in said bushing. The grinding-spindle, reduced somewhat in diameter, projects a short distance beyond the end of the tapering bushing. To this projecting end of the spindle the arbor J, carrying the grinding-wheel K, is secured by means of the washer *p* and screw *q*, the grinding-wheel being firmly clamped between said washer and a shoulder formed upon the arbor, as shown in the drawings. The arbor J is rotatively connected to the grinding-spindle by a pin and slot or other suitable means, so as to rotate therewith. The side of the arbor adjoining the tube H is recessed, forming a flange *r*, which fits over the projection *k* upon the end of the tube H, thus forming a cap to exclude dust from the bearing of the spindle.

The parts are to be assembled, as clearly shown in Fig. 3. A convenient way of assembling the parts is as follows: The tapering bushing I being inserted in the tapered bore of the tube H, the end of the grinding-spindle is inserted into said tube and bushing until the collar *l* brings up against the end of the bushing. The arbor J and the grinding-wheel K are then secured to the end of the spindle by means of the washer *p* and screw *q*. The inner tube G is then slipped over the tail of the spindle and into the outer tube H until the screw-threads upon the two tubes are brought into engagement with each other. The outer tube H is then rotated in a direction to cause the screw-threads to draw the tube H onto the tube G until the forward end of the tube G brings up against the collar *l* on the grinding-spindle. The tubes and spindle thus united together are then inserted in the supports C C′, the grooved tail of the spindle entering the recess in the end of the pulley-shaft, and the grooves in the spindle being engaged with the pins in the recess. The supports C C′ are then clamped upon the tubes G H, the tube G being clamped in the support C and the tube H in the support C′, the tubes being thereby firmly clamped and held against rotation.

It will be seen that with the parts thus assembled the end of the tube G bears against the collar *l* on the grinding-spindle, which collar in turn bears against the end of the tapering bushing. It will also be seen that a further rotation of the tube H in a direction to draw it farther onto the tube G by means of the screw-thread connection will cause the tapering bushing to be forced firmly into the tapered end of the tube H, and thus, by reason of the capacity for contraction which the tapering bushing possesses, cause it to be compressed upon the end of the grinding-spindle, and thus form a snug bearing therefor. When the tube H has been rotated sufficiently to secure this result, it is firmly clamped in the support C' and thus held in position. To facilitate the rotation of the tube H, it may be provided with notches s to receive a spanner-wrench. A collar L is mounted upon the tubes G and H to cover the space between the end of the tube H and the enlarged portion of the tube G, and thus protect the screw-threads from dust and dirt, and also prevent the entrance of dirt or other foreign matter into the oil-duct i. If now, at any time, as the result of wear, there shall come to be any radial motion or play of the grinding-spindle in its bearing, or any longitudinal play therein, by unclamping the support C' and turning the tube H in a direction to draw it still farther onto the tube G the tapering bushing will be forced farther into the tapered bore of the tube H, which, by reason of the capacity of the bushing to be contracted, will cause the interior diameter of said bushing to be reduced, and thus take up any radial motion or play and secure again a snug bearing for the spindle. At the same time the drawing of the two tubes together and the forcing of the tapering bushing into firm contact with the tapered end of the tube H will take up any longitudinal play which there may be. If desired, instead of unclamping the support C' and turning the tube H to make the necessary adjustment, the support C may be unclamped and the tube G rotated, which will serve the same purpose. In this latter case, however, the adjustment will be accompanied by a movement longitudinally of the spindle itself, which is permitted by reason of the pin-and-slot connection between the grinding-spindle and the pulley-spindle, as shown. This longitudinal adjustment of the grinding-spindle will also be of service in taking up wear even when the contraction of the bushing is effected by the rotation of the tube H, and it is apparent that this capacity of the grinding-spindle as to longitudinal motion also permits of an adjustment of the amount of projection of the tubes and spindle beyond the clamping-support, so that the extent of such projection can be regulated within certain limits, according to the depth of the hole whose interior surface is to be ground.

It will be seen that by the improvements hereinbefore described I am enabled to employ a grinding-spindle of comparatively small diameter, whereby the requisite speed of revolution can be attained, while at the same time the necessary rigidity is secured, and, furthermore, that by providing a bearing or support for the spindle in close proximity to the grinding-wheel, together with means for taking up all motion or play of the parts in either direction, the difficulties attending the use of the old form of grinding-spindle are practically overcome and the production of accurate and perfect work made possible.

What I claim as my invention, and desire to secure by Letters Patent, is—

1. The combination of a revolving grinding-spindle of comparatively small diameter, a grinding-wheel mounted on said spindle, and two telescopic tubes inclosing said spindle, one of said tubes furnishing a support or bearing for the spindle in close proximity to the grinding-wheel, the two tubes being adjustable longitudinally relatively to each other for tightening said spindle-bearing, substantially as set forth.

2. The combination of a pulley spindle or shaft, a grinding-spindle rotatively connected to said pulley-spindle, but capable of a longitudinal adjustment relatively thereto, whereby the extent of projection of the grinding-spindle may be adjusted, and a supporting-tube furnishing a bearing for the grinding-spindle in close proximity to the grinding-wheel, substantially as set forth.

3. The combination of a grinding-spindle of comparatively small diameter and provided near its outer end with a collar or enlargement, two telescopic tubes inclosing said spindle, one of said tubes having at its outer end a tapered bore, and a tapering bushing mounted in said tapered bore and furnishing a bearing or support for the spindle in close proximity to the grinding-wheel, the two telescopic tubes being screw-threaded for enabling the longitudinal adjustment of said tubes relatively to each other and so arranged that the outer end of the inner tube bears against the collar or enlargement on the grinding-spindle, whereby by the longitudinal adjustment of said tubes one relatively to the other the tapering bushing will be forced into the tapered bore of the outer tube and any longitudinal play or lost motion of the spindle in its bearing be taken up, substantially as described.

4. The combination of a grinding-spindle of comparatively small diameter and provided near its outer end with a collar or enlargement, two telescopic tubes inclosing said spindle, one of said tubes having at its outer end a tapered bore, and a split tapering bushing mounted in said tapered bore and furnishing a bearing or support for the spindle in close proximity to the grinding-wheel, the two telescopic tubes being screw-threaded for enabling the longitudinal adjustment of said tubes relatively to each other and so arranged that the outer end of the inner tube bears against the collar or enlargement on the grinding-spindle, whereby by the longitudinal adjustment of said tubes one relatively to the other the bearing for the spindle may be tightened and any play or lost motion of the spindle in its bearing, either radially or longitudinally, be taken up, substantially as described.

5. The combination of a pulley spindle or shaft mounted in suitable bearings, a grinding-spindle rotatively connected with said pulley-spindle, but capable of a longitudinal adjustment relatively thereto, said grinding-spindle being provided with a collar or enlargement near its outer end, two telescopic tubes inclosing said grinding-spindle, each of said tubes being held in an adjustable clamping-support and the outer tube being provided at its outer end with a tapered bore, and a split tapering bushing mounted in said tapered bore and furnishing a bearing for the spindle in close proximity to the grinding-wheel, the two telescopic tubes being screw-threaded, so as to be adjustable longitudinally relatively to each other, all so arranged that by unclamping one or the other of said clamping-supports and rotating one or the other of said inclosing-tubes the bearing for the grinding-spindle may be tightened and all play or lost motion of the spindle in its bearing, either radially or longitudinally, be taken up, substantially as described.

6. The combination, with a grinding-spindle and an inclosing supporting-tube having a projection of reduced diameter at its outer end, of an arbor for the grinding-wheel rotatively connected with said grinding-spindle and provided with a projecting flange adapted to inclose the projection upon the end of the supporting-tube, whereby said arbor not only constitutes a support for the grinding-wheel, but also acts as a dust-cap to exclude dirt, &c., from the bearing of the grinding-spindle, substantially as described.

7. The combination of a grinding-spindle and two telescopic tubes inclosing said spindle, the outer tube carrying a bushing at its outer end to furnish a bearing for the spindle in close proximity to the grinding-wheel and the inner tube being provided with a spiral slot communicating with slits or ducts in said bushing for the purpose of conveying oil to the spindle-bearing, substantially as described.

CHARLES H. NORTON.

Witnesses:
W. H. THURSTON,
S. J. MURPHY.